US006794613B1

(12) United States Patent
Krumholz

(10) Patent No.: US 6,794,613 B1
(45) Date of Patent: Sep. 21, 2004

(54) LIGHTER ASSEMBLY

(75) Inventor: Spencer Krumholz, Boca Raton, FL (US)

(73) Assignee: Liteglow Industries, Inc, Pompano Beach, FL (US)

( * ) Notice: Subject to any disclaimer, the term of this patent is extended or adjusted under 35 U.S.C. 154(b) by 0 days.

(21) Appl. No.: 10/439,746

(22) Filed: May 16, 2003

(51) Int. Cl.⁷ .................................................. F23Q 7/00
(52) U.S. Cl. ......................... 219/269; 219/220; 219/263
(58) Field of Search ................................ 219/269, 268, 219/262, 263, 266, 220

(56) References Cited

U.S. PATENT DOCUMENTS 778,444 A  *  12/1904  Carstarphen, Jr. ........... 219/262
2,605,380 A  *  7/1952  Bauman et al. ............. 219/261
3,419,704 A  *  12/1968  Hunt .......................... 219/268
6,538,236 B1  *  3/2003  Rostan ........................ 219/267

FOREIGN PATENT DOCUMENTS

DE       19651926      *   6/1998
JP       5-248635      *   9/1993

* cited by examiner

Primary Examiner—John A. Jeffery
(74) Attorney, Agent, or Firm—Myron Greenspan, Esq.; Lackenbach Siegel LLP

(57) ABSTRACT

The present invention provides a lighter assembly for use in a receptacle. A rigid elongate body is frictionally retained in the receptacle and an engaging arm projects into an axial passage way. An item to be lit engages the engaging arm, which completes a switch and actuates a heating element to ignite the item. An insulator block supports the heating element and protects the heating element from damage during use. Vents allow smoke and ash to escape the lighter assembly, and a lens assembly actuated by the engaging arm lights up for easy location.

17 Claims, 2 Drawing Sheets

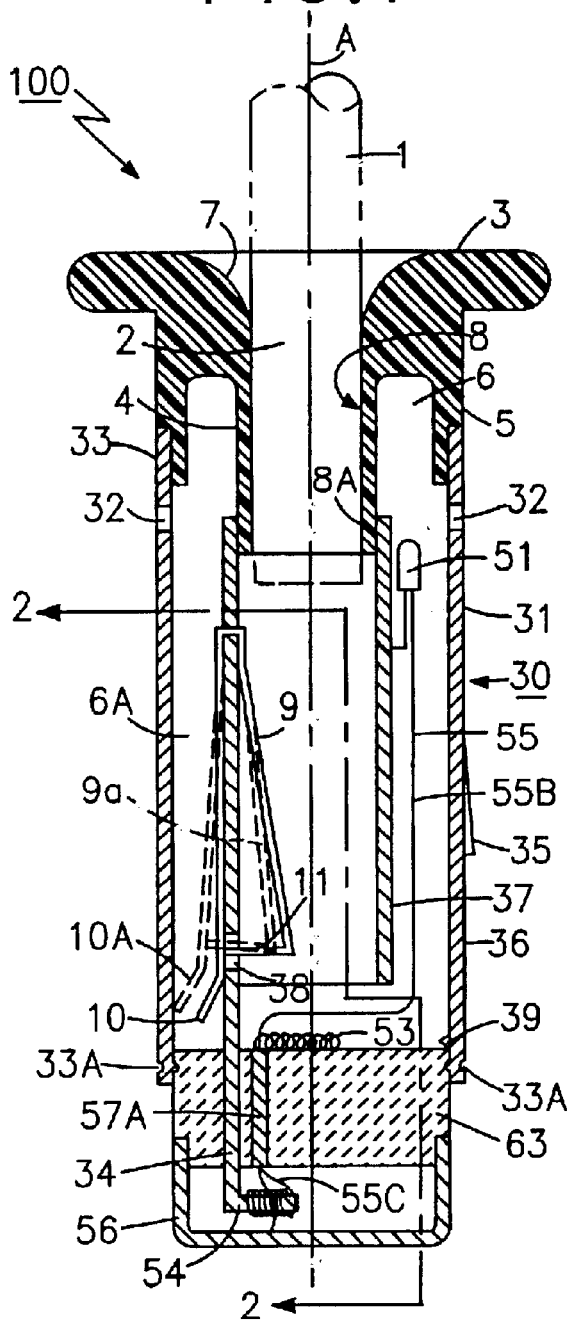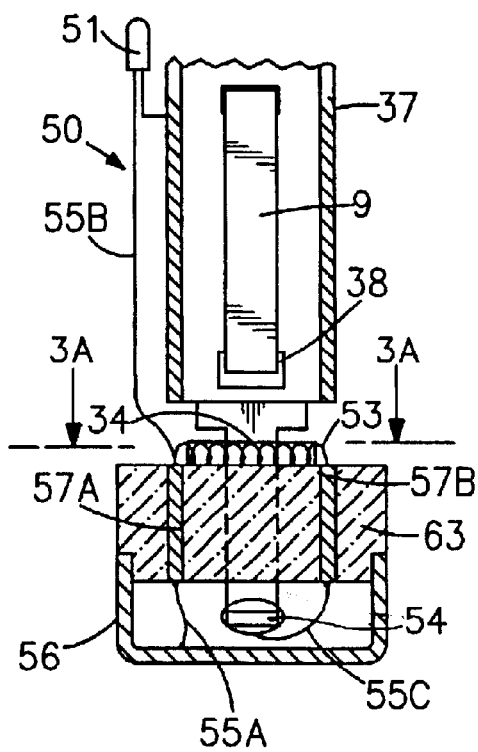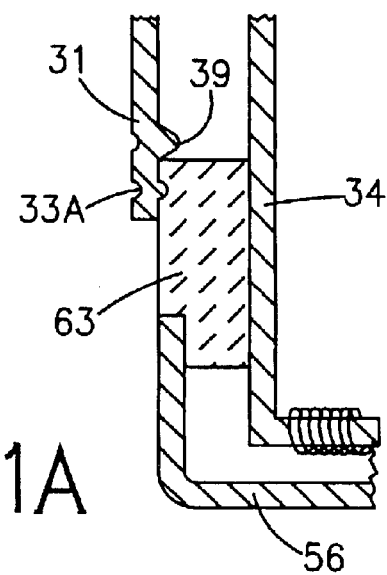

LIGHTER ASSEMBLY

BACKGROUND OF THE INVENTION

1. Field of the Invention

The present invention relates to an automatic lighter assembly. More specifically, the present invention relates to an automatic lighter for use in connection with a lighter receptacle, the lighter receiving an item along at least one longitudinal axis.

2. Description of the Related Art

Conventional electric cigarette lighters have existed for many years. Many types of conventional lighters have been incorporated into vehicle dashboards. Many lighters are of the pop-out variety. Pop-out lighters are actuated by an operator depressing the lighter and contacting the vehicle's wiring harness. During use, electrical resistance heats a heating element and an operator removes the pop-out lighter to light a cigarette. This type of system may require custom pop-out elements different between vehicle models. Commonly, a user cannot easily switch a pop-out lighter between different vehicle models, since each vehicle model may employ different sized receptacles.

The pop-out type lighter system is also dangerous, as a user must handle the hot lighter in an unsecured manner. Through inadvertence or accident, hot pop-out lighters may be dropped on the floor of a car causing a fire or injury to a user. Pop-out lighters are also constructed to unexacting standards, allowing the pop-out mechanism to easily fail, leaving the heating element to become progressively hotter damaging the vehicle or the user. Pop-out designs also provide no way to vent excess heat buildup around a lit item. In sum, while pop-out lighters have been used frequently in recent years due to their low cost, they have many detriments.

Other conventional lighters are built into a vehicles dashboard at a factory or custom shop and cannot be interchanged between vehicles without rewiring the vehicle. Limited types of conventional removable lighters exist which require a generally L-shaped construction pivotably about a pivot point. These conventional lighters extend dangerously and inconveniently into a vehicle's user space risking easy breakage or damage to other items such as drink glasses, music players, and storage bins etc.

The non-linear and non-rigid conventional lighter designs cause stress concentrations about the pivot point or fixed junction in the L-shaped design. In sum, while L-shaped designs may still pivot about the axis of the receptacle they easily break, are unnecessarily expensive to manufacture and are more likely to mechanically or electrically fail during transport.

Conventional lighters also fail to provide convenient and transportable light sources for user convenience and safety. In some designs a light source is mounted on a dashboard in proximity to the lighter, in others a light is provided to illuminate the knob of a conventional lighter to make the knob visible at night or in the darkness to obviate the need for the driver to search for the lighter while driving.

Another difficulty presented with conventional designs is that little provision has been made to ease cleaning tasks and allow ash removal. In fixed conventional designs the unit had to be disassembled or vacuumed out. In removable designs, the ash was removed by shaking the device upside down.

Another difficulty with conventional designs is the lack of provision for efficient combustion. Efficient combustion requires access to an oxygen source and removal of smoke. Conventional designs do not allow easy air circulation and this may decrease the rate of ignition and generate incomplete combustion products dangerous to a user.

In summary, the problems of commercially available cigarette lighters include, but are not limited to:

1. Non-transferable between vehicles.
2. High manufacturing and replacement costs.
3. Low visibility and difficulty of use while operating a vehicle.
4. Limited smoke and ash escape limit unit lifespan and effectiveness.
5. Large size and interference with vehicle operation.
6. Fragile construction.
7. Safety risks through breakage and misuse.

OBJECTS AND SUMMARY OF SELECTED EMBODIMENTS

An object of the present invention is to provide at least one invention that overcomes the detriments of conventional lighter assemblies discussed above.

Another object of the present invention is to provide a robust lighter assembly that is easily portable and transferable between vehicles.

Another object of the present invention is to provide a lighter assembly that is easily accessed and used in suboptimal visual conditions.

Another object of the present invention allows easy removal of ash for cleaning and exhaust of smoke during use.

The present invention relates to a lighter assembly for use in a receptacle. A rigid elongate body is frictionally retained in the receptacle and an engaging arm projects into an axial passage way. An item to be lit engages the engaging arm completing a switch and actuating a heating element to ignite the item. An insulator block supports the heating element and protects the heating element from damage during use. Vents allow smoke and ash to escape the lighter assembly and a lens assembly actuated by the engaging arm lights up for easy location According to an embodiment of the present invention there is provided a lighter assembly, for use in conjunction with a lighter receptacle, comprising: a rigid elongate housing, the housing defining at least one central axis and being dimensioned to be engageably received within the receptacle, the housing having a first contact intermediate axial ends of the assembly for contacting one electrical pole of a power supply connectable to the assembly during a use, and a second contact at one axial end of the assembly for contacting another polarity of the power supply connected to the receptacle during the use, a lens assembly at the other axial end of the assembly, the lens assembly defining an axial passageway dimensioned to at least partially receive an item to be lit for passage through the other axial end towards the one axial end, a light source proximate the lens assembly, a heating means arranged to ignite a received end of the item when inserted through the axial passageway and moved to a predefined axial position relative to the housing, switch means responsive to movement of the item into the axial passageway, and the switch means electrically connecting the heating element and the light source to the first and second contacts only when the item is sufficiently inserted into the axial passageway, whereby the heating element and light source are energized when the item is inserted into the lighter assembly and positioned within the receptacle to ignite the received end and illuminate the lens assembly.

According to another embodiment of the present invention, there is provided a lighter assembly, wherein: the light source is at least one of a miniature incandescent element, a LED element, an LCD element, and an electro luminescent element.

According to another embodiment of the present invention, there is provided a lighter assembly, further comprising at least a sloped rim on the lens assembly, the sloped rim coaxial with the axial passageway, and the sloped rim being at least one of a curved surface and an angular surface, whereby the sloped rim guides the item to be lit into a substantially axial alignment with the axial passageway and minimizes damage to the item during the insertion.

According to another embodiment of the present invention, there is provided a lighter assembly, further comprising: at least a centering guide sleeve in the lens assembly, the guide sleeve being coaxial with the sloped rim, and a centering wall of the centering guide sleeve in smooth contact with a contact surface of the sloped rim, whereby both the sloped rim and the centering guide sleeve guide the item to be lit into the axial alignment with the axial passageway and prevents damage during the insertion.

According to another embodiment of the present invention, there is provided a lighter assembly, further comprising: at least a first annular cavity defined in the lens assembly, the lens assembly being formed from at least one of translucent and a transparent material, the light source positioned proximate the first annular cavity, and the first annular cavity being effective to pass light, emitted from the light source during the use, around the lens assembly and enable an operator to perceive the lighter assembly.

According to another embodiment of the present invention, there is provided a lighter assembly, further comprising: an inner cylinder assembly having a first conductive sleeve, the means for heating in the inner cylinder assembly, the inner cylinder assembly within the elongate housing coaxial the axial passageway, the conductive sleeve partially coaxial with the centering guide sleeve in the lens assembly whereby the received end easily slides from the lens assembly to the means for heating without damage, an annular cavity defined between the first conductive sleeve and the elongate housing, and at least one vent hole in the elongate housing in communication with the annular cavity, whereby combustion products from an ignited received end easily escape from lighter assembly and maintain a clean environment for future use.

According to another embodiment of the present invention, there is provided a lighter assembly, wherein: the heating means includes at least one of a coil heater, a substantially planar ceramic heater, and a non-planar ceramic heater, and the heating means being effectively resistive to electrical current when energized to ignite the received end when the item is inserted to the predefined axial position.

According to another embodiment of the present invention, there is provided a lighter assembly, further comprising: means for blocking an insertion of the received end along the axial passageway beyond the predefined axial position, and the blocking means effective to physically obstruct at least a first portion the axial passageway to prevent an unintended over insertion of the item and damage to the heating means.

According to another embodiment of the present invention, there is provided a lighter assembly, wherein: the heating means is a coil heater, and the coil heating being a wire coil connected in parallel with the light source to the switch means.

According to another embodiment of the present invention, there is provided a lighter assembly, further comprising: an insulator block in the blocking means, the coil heater arrayed on a top face of the insulator block, the insulator block effective to both electrically insulate poles of the coil heater and support the coil heater during the use, a slot in the insulator block, an insulative retainer in the slot, and at least a first portion of the insulative retainer projecting from the top face of the insulator bock and both retaining the coil heater in a predefined arcuate shape and blocking the unintended over insertion of the received end, whereby the blocking means prevents the item from disturbing the coil heater while positioning the received end sufficiently proximate the heating means to easily ignite during the use.

According to another embodiment of the present invention, there is provided a lighter assembly, further comprising: means for frictionally retaining the rigid elongate housing in the receptacle, whereby the lighter assembly is prevented from an unintended removal from the receptacle while allowing an intended removal and repositioning to alternative receptacles.

According to another embodiment of the present invention, there is provided a lighter assembly, further comprising: at least one friction fit member in the means for frictionally fitting, the at least one friction fit member projection from the elongate housing, the at least one fit member elastically contacting walls of the receptacle during an insertion of the lighter assembly, whereby the lighter assembly is slidably retained in the receptacle, and the means for frictionally fitting including the first contact, whereby during an insertion of the lighter assembly in the receptacle, the means for frictionally fitting simultaneously engages the receptacle frictionally and electrically.

According to another embodiment of the present invention, there is provided a lighter assembly, further comprising: an outer conductive shell in the elongate housing, the first contact extending from the outer conductive shell to contact the one electrical pole, the outer conductive shell including at least one vent hole, the at least one vent hole on a portion of the elongate housing extending beyond the lighter receptacle when the lighter assembly is inserted in the receptacle, and the vent hole in communication with both the heating means and the received end, whereby when the received end is ignited, smoke from the item passes through the vent hole and escapes the lighter assembly thereby indicating to an operator that the item is ignited.

According to another embodiment of the present invention, there is provided a lighter assembly, wherein: the light source is at least one of a miniature incandescent element, a LED element, an LCD element, and an electro luminescent element, the heating means includes at least one of a coil heater, a substantially planar ceramic heater, and a non-planar ceramic heater, and the heating means being effectively resistive to electrical current when energized to ignite the received end when the item is inserted to the predefined axial position.

According to another embodiment of the present invention, there is provided a lighter assembly, wherein: the rigid elongate housing is a substantially cylindrical housing.

According to another embodiment of the present invention, there is provided a lighter assembly, wherein: the axial passageway is a central axial passage way in the lens assembly.

According to another embodiment of the present invention, there is provided a lighter assembly, further comprising: an engaging arm in the switch means, the engaging arm elastically projecting into the axial passageway, and the received end contacting and deflecting the engaging arm during an insertion to engage the switch means to allow the heating means to ignite the received end, whereby the lighter assembly is responsive to an insertion of the item and idle when no item is inserted thereby increasing a safety of the lighter assembly.

The above, and other objects, features and advantages of the present invention will become apparent from the following description read in conduction with the accompanying drawings, in which like reference numerals designate the same elements.

BRIEF DESCRIPTION OF THE DRAWINGS

FIG. 1 is a sectional view along a length of the lighter assembly;

FIG. 1(A) is a partial close-up view of a portion of FIG. 1;

FIG. 2 is a partial sectional view along line 2—2 of FIG. 1;

DETAILED DESCRIPTION OF PREFERRED EMBODIMENTS

Figure 3A:
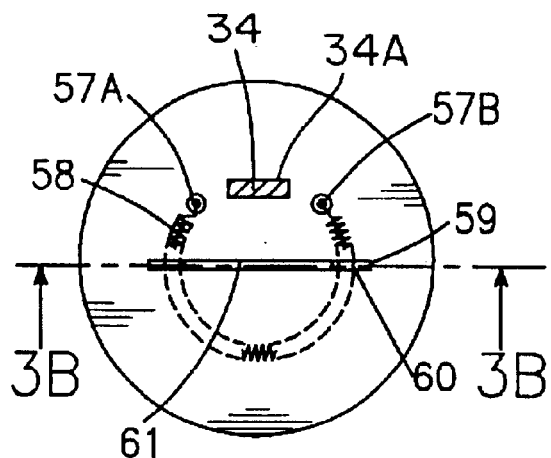
FIG. 3(A) is a partial sectional view along line 3—3 of FIG. 2.

In resolving the issues noted above, embodiments of the present invention provide a lighter assembly that overcomes all the concerns noted above.

Referring now to FIGS. 1, 1(A), and 2, a lighter assembly 100 includes a centering lens 3 and a housing 30 aligned generally along an axis A (alternatively called a central axis A). Axis A is a general axis defined along a lengthwise dimension of lighter assembly 100 (as shown) and need not be at a defined center of lighter assembly 100, as long as the below-described general construction is functionally retained. As shown, lighter assembly 100, in operation and assembly, is a substantially rigid elongate structure, meaning that it has generally more length than width and does not move relative to itself, as will be explained.

Lens 3 extends around axis A into a centering guide sleeve 4 coaxial with axis A, as will be explained. Lens 3 is constructed from materials selected to be partially transparent or translucent, for example plastic, as will be explained.

On an outer user surface of lens 3, a sloped rim 7 smoothly joins a centering wall 8 defining a general axial passageway 2 on an inner surface of centering guide sleeve 4 extending along axis A.

A mating wall 5 extends from an outer surface of lens 3. A first cavity 6 (shown as an annular cavity) is defined between outer mating wall 5 and inner centering wall 8.

Cylinder housing 30 includes an outer conductive shell 31 and an inner cylinder assembly 36 having an inner conductive sleeve 37. A top portion of conductive shell 31 overlaps lower portions of mating wall 5. A set of at least two top crimps 33, 33 securely join overlapping portions of mating wall 5 to the top portion of conductive shell 31, as shown. Consequently, top crimps 33 securely join housing 30 to lens 3. Proximate top crimps 33, 33, a set of vents 32 arrayed around an outer surface of conductive shell 31, ventilate first annular cavity 6 to an external environment, as will be explained.

At a bottom portion of conductive shell 31, a set of two or more blocking grooves 39, are formed perpendicular to axis A by deforming inward selected portions of conductive shell 31. An upper portion of an insulator block 63 is positioned in conductive shell 31 below blocking grooves 39 such that a portion of conductive shell 31 overlaps a portion of insulator block 63, as shown. Blocking grooves 39 prevent insulator block 63 from slipping toward lens 3 during use, as will be explained.

A set of at least two bottom crimps 33A, 33A securely join overlapping portions of conductive shell 31 to the top portion of insulator block 63, and prevent separation between insulator block 63 and conductive shell 31 during use.

A conductive cap 56 is press fit over a lower portion of insulator block 63. Conductive cap 56 may be secured to insulator block 63 by any conventional means, including adhesive or the press fit as shown. Conductive cap 56 covers and protects the lower portion of insulator block 63. A portion of insulator block 63 electrically separates conductive shell 31 and conductive cap 56.

At least one friction fit members 35 elastically projects from an outer portion of conductive shell 31. Friction fit member 35 frictionally and elastically engages one electrical pole (typically an inner wall) of an external lighter assembly receptacle during use and both rotationally stabilizes lighter assembly 100 relative to the external assembly and prevents unintended electrical separation.

A second annular cavity 6A is defined between conductive shell 31 of cylindrical housing 30 and conductive sleeve 37 of inner cylinder assembly 36. Second annular cavity 6A is continuous with first annular cavity defined between mating wall 5 and centering wall 8.

An overlap portion 8A, of centering wall 8 on centering guide sleeve 4, overlaps an outer upper portion of conductive sleeve 37, as shown.

During operation, an external item to be lit 1 (as one example, a cigarette) is inserted by a user along sloped rim 7 into general axial passageway 2 along centering wall 8 of guide sleeve 4. Overlap portion 8A allows an axial end of item to be lit 1 to slide from centering wall 8 to inner conductive sleeve 37 without damaging interference.

A conductive leg 34 extends from conductive sleeve 37 of inner assembly 36 through a hole 34a in insulator block 63, as shown. A conductor tab 54 extends from conductive leg 34 between insulator block 63 and an inner portion of conductive cap 56.

A movable electrical contact 10 includes an engaging arm 9 flexibly projecting into axial passageway 2 for engagement with an item to be lit 1 during use. Movable contact 10 extends over a top portion of conductive sleeve 37 as shown and is electrically joined to conductive sleeve 37. A projection portion 11 of engaging arm 9 extends through a shell opening in conductive sleeve 37 and contacts movable contact 10. Movable contact 10 and engaging arm 9 are shown in a relaxed/non-engaged position. A movable contact 10A and an engaging arm 9A are shown in a deflected/engaged position.

During a use, item to be lit 1 is inserted along axial passageway 3 and flexibly engages engaging arm 9 moving engaging arm 9 into a deflected engaged position. During this motion, projection portion 11 contacts electrical contact 10 and presses it against conductive shell 31.

A circuit 50 includes a wire 55 having a first wire portion 55A extending from conductive cap 56 to a first conductive post 57A secured in insulator block 63. A second wire portion 55B extends from a top of first conductive post 57A to a light emitter 51 positioned within one of annular cavities 6 and 6A and thereafter electrically joins light emitter 51 to conductive sleeve 37 and movable electrical contact 10.

A third wire portion 55C electrically joins conductor tab 54 with a bottom of a second conductive post 57B secured in insulator block 63. First conductive post 57A is spaced apart from second conductive post 57B. A heating element 53 operating as an electrical resistor 53 (shown for example as a coil) is electrically joined between respective tops of first and second conductive posts 57A, 57. An alternative embodiment of the present invention provides heating element 53 as a rigid ceramic resistor element either as a planar cast film or a bar/rod-type element.

As shown, conductive circuit 50 joins heating element 53 and light emitter 51 in an electrically parallel circuit, but an alternative embodiment may allow for a serial circuit without detracting from the novel features of the present invention.

Figure 3B:
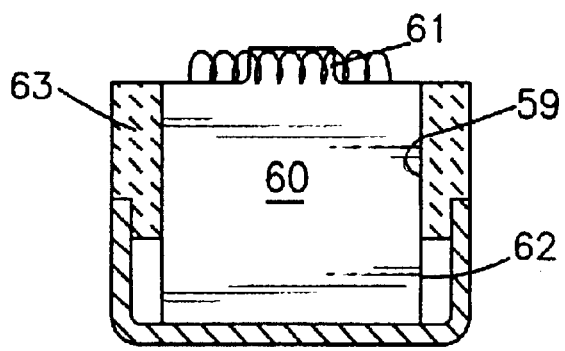
FIG. 3(B) is a partial sectional view along line 4—4 of FIG. 3(A)

Referring now to FIGS. 3(A) and 3(B), in the embodiment shown a slot 59 extends inward from a top surface of insulator block 63. Slot 59 is opposite conductive posts 57A, 57B and hole 34a in insulator block 63. A retained portion 62 of an insulative retainer 60 is secured within slot 59. A blocking leg 61 extends from retained portion 62. Blocking leg 61 projects between ends of heating element 53 (heating coil 53) fixed to conductive posts 57A, 57B, and operates to maintain heating element 53 in a desired expanded and secure position.

As shown, heating element 53 is a heating coil and extends from conductive posts 57A, 57B in a generally arcuate shape. Blocking leg 61 also serves as a crush-resister for heating element 53 (coil) and prevents item to be lit 1 from compressing heating element 53 during use and changing an electrical resistance in circuit 50. A top of blocking leg 60 is proximate a height of heating element 51 to allow at least a close position between an end of item to be lit 1 and heating element 53, but may either prevent actual contact with heating element 53 or allow only a light contact with heating element 53 depending upon a manufacturer's desire.

It should be readily understood by those skilled in the art that where heating element 53 does not require compression protection or position security (for example, when heating element is a ceramic resistor), slot 59 and insulative retainer 60 may be removed without effecting the overall operation and function of the present invention.

Figure 4:
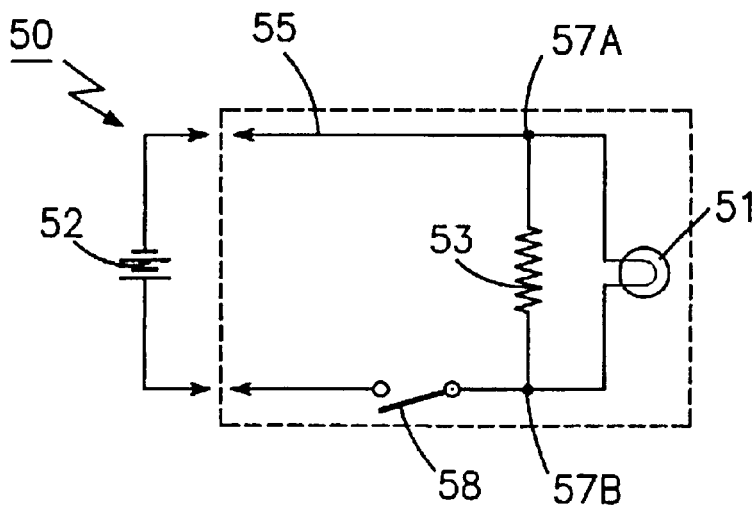
FIG. 4 is a representational circuit diagram of the lighter assembly.

Referring now to FIG. 4, movable contact 10 is represented by switch 58 in circuit 50 and light emitter 51 and heating element 53 are shown in a parallel arrangement. As noted above, with other commonly understood circuit modifications, a serial arrangement may be used after determining the required current loads and resistance for circuit 50.

Positive and negative poles of an external power supply 52, commonly understood as the wiring harness of a vehicle or the vehicles battery, or even an external battery servicing the receptacle for lighter assembly 100, are connected to conductive sections of a lighter assembly receptacle. These conductive sections are frequently the bottom and wall portions of a lighter assembly in a car, but other arrangements are envisioned depending upon consumer and manufacturer desire. These conductive sections are electrically separated so that no current flow exists between the conductive sections without operation of an inserted conductive switch.

During a use of lighter assembly 100, a user inserts lighter assembly into an external receptacle until conductive cap 56 electrically contacts a bottom portion of the receptacle (commonly the positive pole of power supply 52. Simultaneously friction fit members 35 elastically projecting from conductive shell 31 both electrically contacts wall portions of the receptacle and frictionally secures lighter assembly 100 in the external receptacle. Consequently, the external conductive sections of the receptacle remain electrically separated until circuit 50 in lighter assembly 100 is connected by a users action of inserting item to be lit 1 in axial passageway 2.

After securing lighter assembly 100 in the external receptacle, a user inserts item to be lit 1 through axial passageway 2. Sloped rim 7, centering wall 8 of guide sleeve 4, and inner conductive sleeve 37 provide a generally close-guiding fit and prevent axial misalignment away from axis A and damage to item to be lit 1. The user inserts item to be lit 1 until contacting blocking leg 61 of insulative retainer 60, simultaneously item to be lit 1 deflects engaging arm 9 of movable contact 10 until movable contact 10 (operating as switch 58) electrically contacts an inner portion of conductive shell 31 and completes circuit 50.

As circuit 50 is completed both light element 51 and heating element 53 receive a current inherent with their design and operate by either emitting light or glowing to ignite item to be lit 1. It should be understood that as or since power supply 52 preferably provides power in parallel to both heating element 53 and light emitter 51, circuit 50 may be alternatively arranged to feed power through negative post 57B (now acting as positive post 57A) and discharge power through positive post 57A (now acting as negative post 57B) depending upon switch 58 placement and other factors obvious to those skilled in the art of designing electrical circuits.

One skilled in art of designing related types of engagement circuits 50 will recognize that circuit 50 may be easily modified to allow light emitter 51 to be any one of a miniature incandescent element, a LED element, an LCD element, or an electro luminescent element depending upon the type of power supplied from power supply 52 and a customer demand. For example, circuit 50 may be adapted to supply a current adapted to any combination of different heating elements 53 and light emitters 51.

One benefit of the present design is that light emitted by light emitter 51 passes through transparent or translucent lens 3 and can be readily perceived by an operator. An operator easily perceives this emitted light both looking directly at lighter assembly 100, and looking tangentially at lighter assembly 100 while driving. Consequently, at night, while operating lighter assembly 100, an operator may both view item to be lit 1 extending from lens 3, but also any smoke issuing from cylinder vents 32 and remove item to be lit 1 both safely while driving and at an optimal time for use. It should be understood, that one of the benefits of the present design is that annular cavity 6 allows light emitted from light emitter 51 to easily pass about an entire circumference and entirely illuminate lens 3. Where a manufacturer or customer designs opaque sections of lens 3 to indicate a name or other symbol, these sections are backlit by light emitter 51 and easily seen by an operator.

Another benefit of the present design is that cylinder vents 32 allow smoke, created by igniting item to be lit 1 to easily pass away from heating element 53, through second annular cavity 6A and exit lighter assembly 100. Remaining smoke also issues from axial passageway 2 after a withdrawal of item to be lit 1. Consequently, there is little smoke residue build up internally in lighter assembly. This limited residue build up ensures an extended operable life for movable contact 10. Additionally, since residue does not build up between contact 10 and conductive sleeve 37, and acting as a fulcrum to stress contact 10, contact 10 is not subjected to non-designed bending forces.

As with smoke, another benefit of the present design is simple and quick ash removal. Ash residue from most types of tobacco products (items to be lit 1) is easily friable and is either in small particles in an original state or is easily broken into small particles by simply removing lighter assembly 100 from a receptacle and shaking it. The small ash particles easily slide out of axial passageway 2, or are easy to shake free from lighter assembly 100 along annular cavities 6A through vents 32 and possibly friction fit members 35 depending upon overall design.

Another benefit of the present design is that it may be readily adapted to a variety of receptacles in a variety of environments. While we have discussed preferred embodiments involving common lighter receptacles in vehicles, these receptacles may be adapted for positioning on boats, golf carts, and in smoking lounges. These receptacles and the present design may be expanded in diameter to easily accommodate larger sized items to be lit, for example cigars.

In the claims, any means- or step-plus-function clauses are intended to cover the structures described or suggested herein as performing the recited function and not only structural equivalents but also equivalent structures. Thus, for example, although a nail, a screw, and a bolt may not be structural equivalents in that a nail relies entirely on friction between a wooden part and a cylindrical surface, a screw's helical surface positively engages the wooden part, and a bolt's head and nut compress opposite sides of at least one wooden part, in the environment of fastening wooden parts, a nail, a screw, and a bolt may be readily understood by those skilled in the art as equivalent structures.

Although only a single or few exemplary embodiments of this invention have been described in detail above, those skilled in the art will readily appreciate that many modifications are possible in the exemplary embodiment(s) without materially departing from the novel teachings and advantages of this invention. Accordingly, all such modifications are intended to be included without departing from the scope or spirit of the invention as defined in the following claims.

What is claimed is:

1. A lighter assembly, for use in conjunction with a lighter receptacle, comprising:
    a rigid elongate housing;
    said housing defining at least one central axis and being dimensioned to be engageably received within said receptacle;
    said housing having a first contact intermediate axial ends of said assembly for contacting one electrical pole of a power supply connectable to said assembly during a use, and a second contact at one axial end of said assembly for contacting another polarity of said power supply connected to said receptacle during said use;
    a lens assembly at said other axial end of said assembly;
    said lens assembly defining an axial passageway dimensioned to at least partially receive an item to be lit or passage through said other axial end towards said one axial end;
    a light source proximate said lens assembly;
    heating means arranged for igniting a received end of said item when inserted through said axial passageway and moved to a predefined axial position relative to said housing;
    switch means responsive to movement of said item into said axial passageway; and
    said switch means electrically connecting said heating element and said light source to said contacts only when said item is sufficiently inserted into said axial passageway, whereby said heating element and said light source are energized when said item is inserted into said lighter assembly positioned within said receptacle to ignite said received end and illuminate said lens assembly during said use.

2. A lighter assembly, according to claim 1, wherein:
    said light source is at least one of a miniature incandescent element, a LED element, an LCD element, and an electro luminescent element.

3. A lighter assembly, according to claim 2, further comprising
    at least a sloped rim on said lens assembly;
    said sloped rim coaxial with said axial passageway; and
    said sloped rim being at least one of a curved surface and an angular surface, whereby said sloped rim guides said item to be lit into a substantially axial alignment with said axial passageway and minimizes damage to said item during said insertion.

4. A lighter assembly, according to claim 3, further comprising:
    at least a centering guide sleeve in said lens assembly;
    said guide sleeve being coaxial with said sloped rim; and
    a centering wall of said centering guide sleeve in smooth contact with a contact surface of said sloped rim, whereby both said sloped rim and said centering guide sleeve guide said item to be lit into said axial alignment with said axial passageway and prevents damage during said insertion.

5. A lighter assembly, according to claim 4, further comprising:
    at least a first annular cavity defined in said lens assembly;
    said lens assembly being formed from at least one of translucent and a transparent material;
    said light source positioned proximate said first annular cavity; and
    said first annular cavity being effective to pass light, emitted from said light source during said use, around said lens assembly and enable an operator to perceive said lighter assembly.

6. A lighter assembly, according to claim 5, further comprising:
    an inner cylinder assembly having a first conductive sleeve;
    said means for heating in said inner cylinder assembly;
    said inner cylinder assembly within said elongate housing coaxial said axial passageway;
    said conductive sleeve partially coaxial with said centering guide sleeve in said lens assembly whereby said received end easily slides from said lens assembly to said means for heating without damage;
    an annular cavity defined between said first conductive sleeve and said elongate housing; and
    at least one vent hole in said elongate housing in communication with said annular cavity, whereby combustion products from an ignited received end easily escape from lighter assembly and maintain a clean environment for future use.

7. A lighter assembly, according to claim 2, wherein:

said heating means includes at least one of a coil heater, a substantially planar ceramic heater, and a non-planar ceramic heater; and said heating means being effectively resistive to electrical current when energized to ignite said received end when said item is inserted to said predefined axial position.

8. A lighter assembly, according to claim 7, further comprising:

means for blocking an insertion of said received end along said axial passageway beyond said predefined axial position; and said blocking means effective to physically obstruct at least a first portion said axial passageway to prevent an unintended over insertion of said item and damage to said heating means.

9. A lighter assembly, according to claim 8, wherein:

said heating means is a coil heater; and said coil heating being a wire coil connected in parallel with said light source to said switch means.

10. A lighter assembly, according to claim 9, further comprising:

an insulator block in said blocking means;

said coil heater arrayed on a top face of said insulator block;

said insulator block effective to both electrically insulate poles of said coil heater and support said coil heater during said use;

a slot in said insulator block;

an insulative retainer in said slot; and at least a first portion of said insulative retainer projecting from said top face of said insulator bock and both retaining said coil heater in a predefined arcuate shape and blocking said unintended over insertion of said received end, whereby said blocking means prevents said item from disturbing said coil heater while positioning said received end sufficiently proximate said heating means to easily ignite during said use.

11. A lighter assembly, according to claim 1, further comprising:

means for frictionally retaining said rigid elongate housing in said receptacle, whereby said lighter assembly is prevented from an unintended removal from said receptacle while allowing an intended removal and repositioning to alternative receptacles.

12. A lighter assembly according to claim 11, further comprising:

at least one friction fit member in said means for frictionally fitting;

said at least one friction fit member projection from said elongate housing;

said at least one fit member elastically contacting walls of said receptacle during an insertion of said lighter assembly, whereby said lighter assembly is slidably retained in said receptacle; and said means for frictionally fitting including said first contact, whereby during an insertion of said lighter assembly in said receptacle, said means for frictionally fitting simultaneously engages said receptacle frictionally and electrically.

13. A lighter assembly, according to claim 1, further comprising:

an outer conductive shell in said elongate housing;

said first contact extending from said outer conductive shell to contact said one electrical pole;

said outer conductive shell including at least one vent hole;

said at least one vent hole on a portion of said elongate housing extending beyond said lighter receptacle when said lighter assembly is inserted in said receptacle; and said vent hole in communication with both said heating means and said received end, whereby when said received end is ignited, smoke from said item passes through said vent hole and escapes said lighter assembly thereby indicating to an operator that said item is ignited.

14. A lighter assembly according to claim 1, wherein:

said light source is at least one of a miniature incandescent element, a LED element, an LCD element, and an electro luminescent element;

said heating means includes at least one of a coil heater, a substantially planar ceramic heater, and a non-planar ceramic heater; and said heating means being effectively resistive to electrical current when energized to ignite said received end when said item is inserted to said predefined axial position.

15. A lighter assembly, according to claim 1, wherein: said rigid elongate housing is a substantially cylindrical housing.

16. A lighter assembly, according to claim 15, wherein: said axial passageway is a central axial passage way in said lens assembly.

17. A lighter assembly, according to claim 1, further comprising:

an engaging arm in said switch means;

said engaging arm elastically projecting into said axial passageway; and said received end contacting and deflecting said engaging arm during an insertion to engage said switch means to allow said heating means to ignite said received end, whereby said lighter assembly is responsive to an insertion of said item and idle when no item is inserted thereby increasing a safety of said lighter assembly.

* * * * *